United States Patent [19]

Baker et al.

[11] Patent Number: 4,680,620

[45] Date of Patent: Jul. 14, 1987

[54] MEASUREMENT OF SC/H PHASE USING A SUBCARRIER TIME MARK GENERATOR AND A CALIBRATED PHASE SHIFTER

[75] Inventors: Daniel G. Baker, Aloha; Kenneth M. Ainsworth, Bend, both of Oreg.

[73] Assignee: Tektronix, Inc., Beaverton, Oreg.

[21] Appl. No.: 836,944

[22] Filed: Mar. 6, 1986

[51] Int. Cl.$^4$ .................. H04N 17/02; H04N 9/44
[52] U.S. Cl. .................................. 358/10; 315/377; 324/83 R; 324/88; 368/115; 368/116; 368/117
[58] Field of Search .................. 358/10; 315/377; 324/88, 83; 368/115, 116, 117

[56] References Cited

U.S. PATENT DOCUMENTS

| | | | |
|---|---|---|---|
| 2,285,038 | 6/1942 | Loughlin | 324/88 |
| 2,344,745 | 3/1944 | Somers | 368/115 |
| 2,434,264 | 1/1948 | Edson | 368/115 |
| 2,720,647 | 10/1955 | Shepherd et al. | 368/116 |
| 2,924,777 | 2/1960 | Liu et al. | 324/88 |
| 3,427,541 | 2/1969 | Middleton | 315/377 |

FOREIGN PATENT DOCUMENTS 585909  2/1947  United Kingdom .................. 324/88

OTHER PUBLICATIONS

Spicer, NTSC Color-Field Identification, SMPTE Journal, Jul. 1982, pp. 627–633.

*Primary Examiner*—John W. Shepperd
*Attorney, Agent, or Firm*—John Smith-Hill

[57] ABSTRACT

Apparatus for indicating the timing relationship between a reference point of a repetitive input signal, e.g. the horizontal sync point of a video signal, and a signal element that repeats at a higher frequency than the input signal, e.g. an element of the color burst, comprises a phase-locked oscillator for generating a continuous wave signal that is in phase with the signal element. The continuous wave signal is used to generate a train of pulses having a repetition frequency that is equal to the repetition frequency of the signal element and is selectively variable in phase relative to the continuous wave signal, and this train of pulses is used to modulate a display of the repetitive input signal in a dimension other than one that is used in a normal waveform display, e.g. intensity. By alternately bringing the pulse train into phase with the reference point of the input signal and the higher frequency signal element, the phase relationship between the signal element and the reference point can be determined from the required phase adjustment.

10 Claims, 5 Drawing Figures

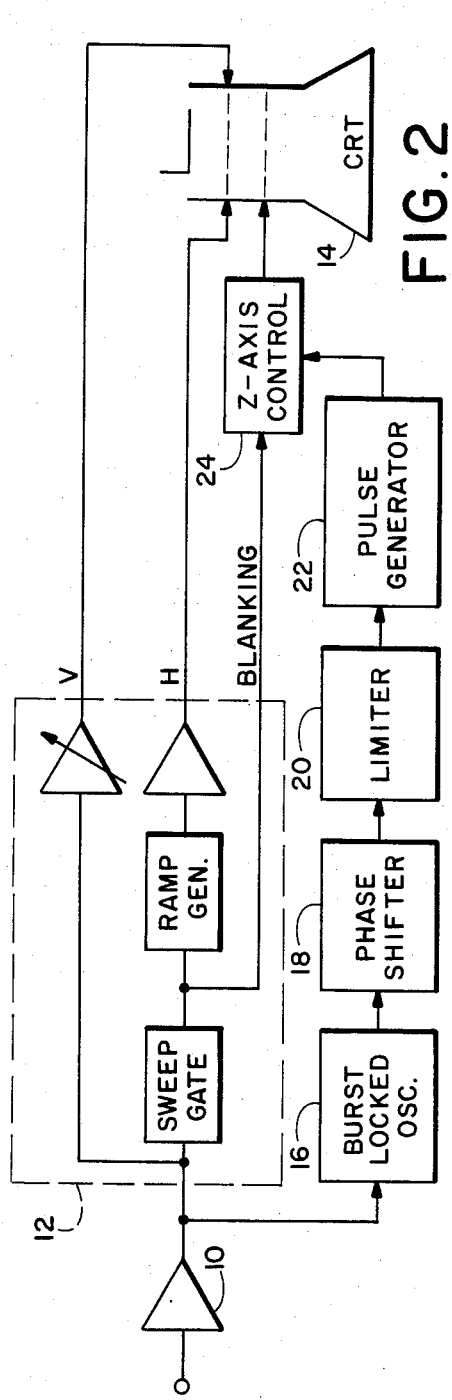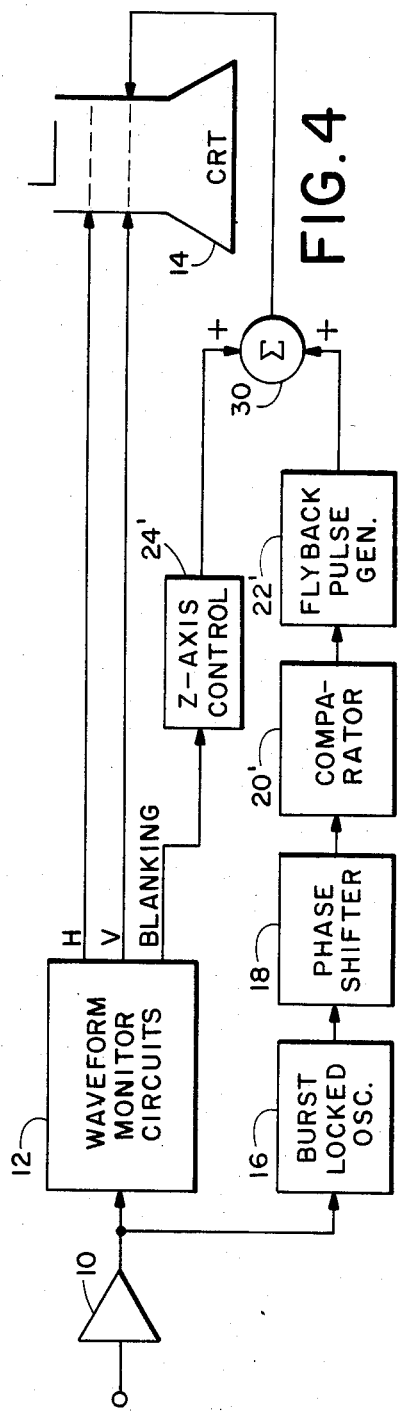

MEASUREMENT OF SC/H PHASE USING A SUBCARRIER TIME MARK GENERATOR AND A CALIBRATED PHASE SHIFTER

This invention relates to the measurement of SC/H phase.

BACKGROUND OF THE INVENTION

The composite color video signals that are conventionally broadcast, for example in the NTSC (National Television System Committee) format, contain not only picture information (luminance and chrominance components) but also timing information (vertical sync pulses and horizontal sync pulses) and other reference information (e.g. equalizing pulses and color burst). Referring to FIG. 1 of the accompanying drawings, the horizontal sync pulse 2 and burst 4 both occur in the horizontal blanking interval, i.e., the interval between the active line times of consecutive horizontal scan lines. The horizontal sync pulse is a negative-going pulse having an amplitude of 40 IRE units, the 50 percent point 6 of the leading edge of the sync pulse being regarded as the horizontal sync point. Burst follows the horizontal sync pulse in the horizontal blanking interval and comprises a sinusoidal wave. The peak-to-peak amplitude of the burst is 40 IRE units, and immediately before and after the burst the signal is at blanking level (zero IRE). The burst ideally has a sine-squared envelope, and builds up from, and decays to, blanking level within one or two cycles of the burst wave. In accordance with EIA (Electronics Industries Association) standard RS 170 A, the start of burst is defined by the zero-crossing (positive or negative slope) that precedes the first half-cycle of subcarrier that is 50 percent or greater of the burst amplitude, i.e., 40 IRE. The color burst is used in the television receiver to control a phase-locked oscillator which generates a continuous wave at subcarrier frequency and is used to extract the chrominance information from the composite video signal.

Although the NTSC frame is made up of 525 lines which are scanned in two interlaced fields of 262.5 lines each, the NTSC color signal requires a four field sequence, and in order to facilitate matching between video signals from different sources, e.g. at the input to a production switcher, it is necessary to distinguish between the different fields of the four field sequence. Fields 1 and 2 can be distinguished on the basis of vertical sync information, but in order to distinguish field 1 from field 3 (or field 2 from field 4) it is necessary to consider SC/H (subcarrier to horizontal sync) phase. In accordance with standard RS 170 A, field 1 is characterized by the fact that a positive-going zero crossing of the extrapolated color burst (the continuous wave at subcarrier frequency and in phase with burst) on line 10 coincide with the sync point of that line. The pattern of sync and burst information for fields 1 and 3 is identical except for the phase of burst. Thus, in field 3, the negative-going zero crossing of the extrapolated color burst coincides with the sync point on line 10. Accordingly, in order to identify the different fields of the four field color sequence, and to adjust the SC/H phase so as to achieve the desired coincidence between the zero crossing point of the extrapolated color burst and the sync point, it is necessary to be able to observe the phase of the color burst relative to the sync point.

Several attempts have previously been made to measure SC/H phase. For example, using the Tektronix 1410 signal generator, it is possible to generate, in the middle of an unused line containing equalizing pulses, a wave at subcarrier frequency and in phase with burst. Since the leading edges of the equalizing pulses are midway between sync pulses, a measurement of subcarrier to horizontal sync phase can be implied by comparing the wave with the equalizing pulse timing. Alternatively the 1410 signal generator can generate a burst phased subcarrier during horizontal blanking which replaces a sync pulse and which can be compared with the remaining sync pulses. However, this equipment is not always available to technicians who need to make SC/H phase measurements. The Grass Valley Group 3258 SC/H phase meter provides a digital output of the phase difference between subcarrier and horizontal sync, but this again requires availability of dedicated equipment.

It is also known to measure SC/H phase using a dual trace oscilloscope having delayed sweep and the capability of inverting the input of one channel. The video signal and a CW signal at subcarrier frequency are applied to the oscilloscope in A plus B mode with the video signal inverted, and the phase of the CW signal is adjusted to achieve a null during burst of the video signal so that the CW signal is then in phase with burst. The oscilloscope is then adjusted to the chop mode and non-inverted video, and in this state the oscilloscope displays three traces, namely the waveform of the video signal, and two waveforms of the CW signal, triggered 180° out of phase. The two waveforms of the CW signal cross at 0° and 180° and therefore the horizontal distance between the sync point and the nearest crossing point of the two waveforms of the CW signal is a measure of SC/H phase. This method of measuring SC/H phase requires use of equipment that might not be readily available to technicians, and suffers from the disadvantage that the oscilloscope display of the video waveform is contaminated with the two waveforms of the CW signal.

The waveform monitor, which provides an X-Y display of the amplitude of a video signal in the time domain, is commonly used by video engineers and technicians, but the conventional waveform monitor cannot be used to provide a reliable measurement of SC/H phase.

SUMMARY OF THE INVENTION

In a preferred embodiment of the invention, the timing relationship between a reference point of a repetitive input signal, e.g. the horizontal sync point of a video signal, and a signal element that repeats at a higher frequency than the input signal, e.g. an element of the color burst, is indicated by apparatus comprising a phase-locked oscillator which generates a continuous wave signal that is phase-locked to the signal element. The continuous wave signal is used to generate a train of pulses having a repetition frequency that is equal to the repetition frequency of the signal element and is selectively variable in phase relative to the continuous wave signal. If the pulse train is brought into phase with the high frequency signal element (color burst) of the input signal, the phase relationship between the signal element and the reference point can be determined from the adjustment that must be made to the phase of the pulse train in order to bring the pulse train into phase with the reference point (the sync point).

By making only minor changes to a conventional waveform monitor, the present invention makes it possible to use the conventional TV line display to set SC/H phase.

BRIEF DESCRIPTION OF THE DRAWINGS

For a better understanding of the invention, and to show how the same may be carried into effect, reference will now be made, by way of example, to the accompanying drawings in which:

FIG. 2 is a block diagram of a first measurement instrument embodying the present invention, FIG. 4 is a block diagram of a second measurement instrument embodying the present invention.

DETAILED DESCRIPTION

The measurement instrument shown in FIG. 2 comprises an input amplifier 10 which receives a baseband composite video signal at its input terminal and applies the signal to waveform monitor circuits 12. The waveform monitor circuits are of known form, for example of the kind used in the Tektronix 1740 vector/waveform monitor, and therefore are not shown in detail. The waveform monitor circuits generate horizontal and vertical deflection signals for application to the X and Y deflection plates of a CRT 14, and also generate a blanking signal for blanking the CRT during retrace. The blanking signal also blanks the CRT at other selectable times in order to provide a clear display of desired features of the waveform. For example, the waveform monitor circuits may be set to blank the CRT during all lines of the signal other than line 10, so that the waveform on line 10 of field 1 or 3 can be clearly seen on the CRT.

Figure 1:
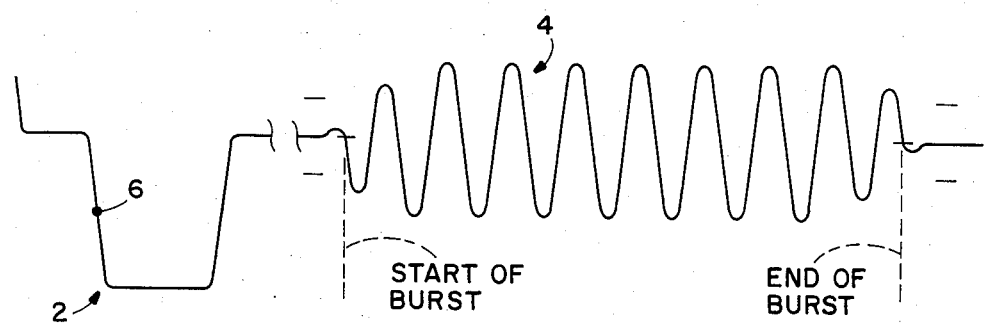
FIG. 1 illustrates diagrammatically the waveform of the NTSC video signal during the horizontal blanking interval.
Figure 3:
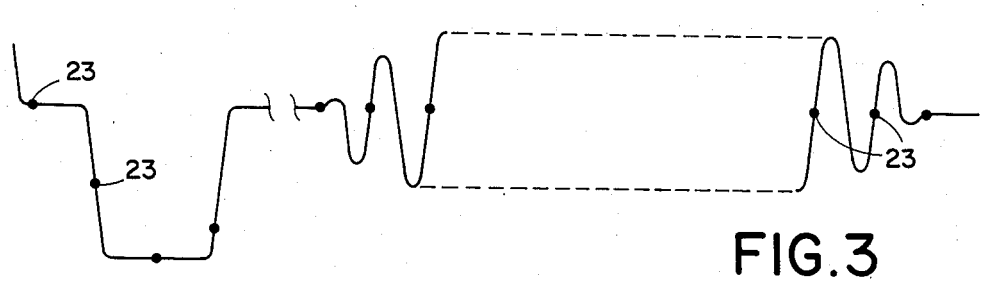
FIG. 3 illustrates the waveform produced by the FIG. 2 instrument.
Figure 5:
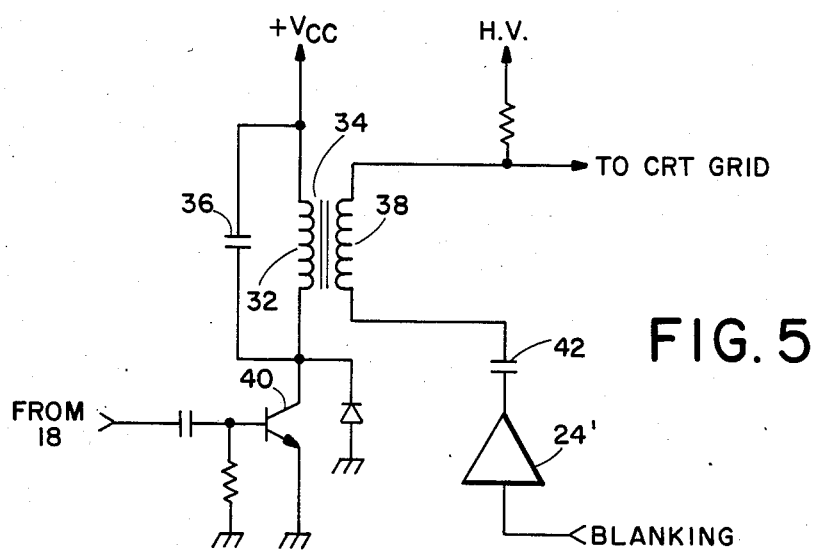
FIG. 5 illustrates partly schematically a portion of the FIG. 4 instrument.

In addition to the waveform monitor circuits 12, the measurement instrument comprises a burst-locked oscillator 16 which generates a continuous wave (CW) sinusoidal signal which is phase locked to burst, and a variable phase shifter 18 which receives the burst-locked CW signal and provides at its output a CW signal at the same frequency as the color burst but shifted in phase relative to the color burst by a selectively variable amount. The output of the phase shifter 18 is applied to a limiter 20 which generates a square wave pulse train at subcarrier frequency and in phase with the output of the phase shifter 18. The square wave output signal from the limiter 20 is applied to a pulse generator 22 which generates a short (10 ns half amplitude duration, for example) pulse at each rising edge of the square wave pulse train, and these pulses are applied to a Z-axis control circuit 24. The Z-axis control circuit also receives the blanking information from the waveform monitor circuits 12. The Z-axis control circuit 24 operates to blank the CRT 14 not only in response to the circuits 12 but also during the pulses received from the pulse generator 22. Accordingly, the pulses add markers 23 to the waveform generated by the CRT 14 in response to the horizontal and vertical information provided by the waveform monitor circuits 12, as shown in FIG. 3. These markers may be points of reduced intensity, i.e. blanked intervals in the waveform, but it is preferred that the markers be points of increased brightness. The phase shifter 18 is first adjusted to align the markers with the positive-going zero crossings of burst. This adjustment renders any phase difference between the input and output signals of the phase shifter insignificant. The phase shifter is then adjusted to bring one of the markers into coincidence with the fifty percent point of the leading edge of sync. The amount by which the phase of the pulse train must be shifted in order to achieve coincidence is equal to the phase difference between subcarrier and horizontal sync. In FIG. 3, the markers 23 are aligned with the positive-going zero crossings of burst and one marker coincides with the fifty percent point of sync. This technique makes it possible to determine the SCH phase of the input video signal to an accuracy of better than 15 subcarrier degrees.

In the preferred embodiment of the invention, shown in FIG. 4, the limiter of FIG. 2 is implemented as a comparator 20' and the pulse generator 22 of FIG. 2 is implemented as a resonant flyback pulse generator 22'. The output of the flyback pulse generator 22' is not applied directly to the Z-axis control circuit 24', but instead the outputs of the resonant flyback pulse generator and the Z-axis control circuit 24' are combined in a summing network 30. This provides a narrow pulse, isolated from the high d. c. voltage normally present on the CRT grid.

The resonant flyback pulse generator 24' comprises an inductor 32, formed by the primary winding of a toroid transformer 34, and a capacitor 36, and the output pulses, in the secondary winding 38 of the transformer, are generated in timed relation to the closing of a saturated switch formed by a transistor 40 that is connected between the resonant circuit and ground. The transistor 40 also functions as the comparator 20', in that it receives the output of the phase shifter 18 at its base and it is switched on during positive half-cycles and off during negative half-cycles. The function of the summing network 30 is provided by connecting the secondary winding of the transformer 34 in series between the output of the Z-axis control circuit 24' (implemented as an amplifier having a d. c. blocking capacitor 42 at its output) and the CRT grid,, so that the voltage induced in the winding 38 is superimposed on the a. c. component of the output signal of the circuit 24'. The resonant flyback pulse generator generates pulses of less than 20 ns HAD at subcarrier frequency, and it will be appreciated that those pulses are much narrower, and at a much higher frequency, than the pulses generated by a resonant flyback pulse generator in its most common application, which is in the horizontal deflection circuit of a television receiver.

The Tektronix 1740 vector/waveform monitor includes a burst-locked subcarrier regenerator and an adjustable phase shifter which are conventionally used when the monitor operates in its vector mode, and therefore they are available for use in the waveform mode in conjunction with the circuits 20 and 22 (or 20' and 22') in order to provide an instrument embodying the present invention.

It will be seen that the described embodiments of the invention allow for the production of a reliable and reasonably accurate measurement and/or adjustment of SC/H phase without having to carry out any processing of the video signal itself and only minimal processing of the CW signal. By simply blanking the CRT in order to provide the markers, the potential for distortion or contamination of the normal waveform display is minimized. No attempt is made by the instrument to identify the sync point, and therefore there is no possibility for error in this regard, for example in the event that the sync pulse has an amplitude different from 40 IRE units, in which event the 50 percent point of the leading edge would not be at −20 IRE units.

It will be appreciated that the present invention is not restricted to the particular embodiments that have been described and illustrated, and that variations may be made therein without departing from the scope of the invention as defined in the appended claims, and equivalents thereof. For example, the markers could be generated on the falling edges of the pulses provided by the circuit 20 or 20', instead of on the rising edges of those pulses. Moreover, the output of the phase shifter 18 could be used to drive the Z-axis control circuit 24 directly, resulting in the waveform being made up of a series of brighter and darker dashes, of substantially equal length. However, since the output signal from the phase shifter is a sine wave, and therefore does not have sharp transitions, the ends of the dashes are not well defined and so the resolution is not as good as it is when a pulse generator is used to provide dots as the markers. The markers may be generated by modulating the light dot that forms the trace on the CRT 14 in some dimension other than intensity. For example, vertical markers of uniform intensity may be carried on the waveform of the video signal, or by use of a color shutter arrangement the perceived color of the waveform may be altered along the horizontal axis in response to the output of the phase shifter 18. It is necessary only that the light dot be modulated in a dimension other than one that is used in a normal waveform display, i.e. vertical deflection in linear relationship to signal amplitude.

We claim:

1. Apparatus for indicating the timing relationship between a reference point of an input signal that repeats at a first, lower frequency and a signal element that repeats at a second, higher frequency, comprising a display device having a display surface, means for generating a visible dot on the display surface, first deflection means for repeatedly deflecting the position of the visible dot in a first direction at a uniform rate and in synchronism with the repetition of the input signal, and second deflection means for deflecting the position of the visible dot in a second direction that is substantially perpendicular to said first direction by a distance that depends substantially linearly upon the amplitude of the input signal, whereby the display device displays a visible trace representing the waveform of at least a part of the input signal, and the apparatus also comprising signal generator means for generating a continuous repetitive signal having a repetition frequency that is integrally related to said second frequency, phase adjustment means for selectively varying the phase of the continuous repetitive signal relative to said signal element, and modulator means for modulating the visible dot in response to the continuous repetitive signal, in a selected dimension other than spatially in a linear relationship with the amplitude of the continuous repetitive signal, whereby the visible trace includes features indicating the phase of the continuous repetitive signal and the phase relationship between the signal element and the reference point can be determined by calibrated adjustment of the phase of the continuous repetitive signal.

2. Apparatus according to claim 1, wherein said signal generator means comprise a phase-locked oscillator for generating a continuous wave signal having a frequency that is equal to said second frequency, the continuous wave signal being in a constant phase relationship with said signal element.

3. Apparatus according to claim 2, wherein said signal generator means also comprise pulse generator means connected to receive a continuous wave signal that is in predetermined phase relationship with the signal generated by the phase-locked oscillator and for generating a continuous train of pulses having a repetition frequency that is equal to said second frequency and being in predetermined phase relationship with the signal received by the pulse generator means.

4. Apparatus according to claim 3, wherein said phase adjustment means comprise a phase shifter that is interposed between the phase-locked oscillator and the pulse generator means.

5. Apparatus according to claim 3, wherein the pulse generator means comprise a comparator for receiving the continuous wave signal and generating a rectangular pulse train in response thereto, and a flyback pulse generator for receiving the rectangular pulse train and generating a train of short pulses in response thereto.

6. Apparatus according to claim 3, wherein the pulse generator means comprise a saturated switch transistor connected to receive the continuous wave signal, and a resonant circuit connected to the transistor, said resonant circuit including a first inductor, and the apparatus also comprising a second inductor arranged in inductively-coupled relationship with the first inductor for applying to said third means pulses induced in the second inductor in response to current flow in the first inductor.

7. Apparatus according to claim 1, wherein the signal element is a cycle of a sinusoidal wave, and the signal generator means comprise means for generating a continuous wave sinusoidal signal at said second frequency and in a constant phase relationship with said cycle of said sinusoidal wave.

8. Apparatus according to claim 7, wherein the signal generator means further comprise a comparator for generating a rectangular wave signal and an astable pulse generator for receiving the rectangular wave signal and generating a continuous train of pulses having a repetition frequency that is equal to said second frequency.

9. Apparatus according to claim 7, wherein the phase adjustment means comprise an adjustable phase shifter for providing a continuous wave signal that is selectively variable in phase relative to the continuous wave signal generated in response to said signal element, and the signal generator means further comprise means for receiving the continuous wave signal from the adjustable phase shifter and generating therefrom a continuous train of pulses that is in phase with the continuous wave signal provided by the adjustable phase shifter and has a repetition frequency that is equal to said second frequency.

10. Apparatus according to claim 1, wherein the modulator means comprise Z-axis control means for controlling the intensity of the visible dot, whereby the brightness of the visible dot is adjusted at the repetition frequency of the continuous repetitive signal.

* * * * *